United States Patent
D'Souza et al.

(10) Patent No.: US 9,217,068 B2
(45) Date of Patent: Dec. 22, 2015

(54) ALKALINE EARTH METAL ALUMINATE SPINELS AND METHODS FOR THE PREPARATION AND USE THEREOF

(71) Applicant: Saudi Basic Industries Corporation, Riyadh (SA)

(72) Inventors: Lawrence D'Souza, Thuwal (SA); Vinu Viswanath, Thuwal (SA); Sandro Gambarotta, Thuwal (SA)

(73) Assignee: SAUDI BASIC INDUSTRIES CORPORATION, Riyadh (SA)

(*) Notice: Subject to any disclaimer, the term of this patent is extended or adjusted under 35 U.S.C. 154(b) by 50 days.

(21) Appl. No.: 14/197,317

(22) Filed: Mar. 5, 2014

(65) Prior Publication Data

US 2014/0255695 A1 Sep. 11, 2014

Related U.S. Application Data

(60) Provisional application No. 61/773,507, filed on Mar. 6, 2013.

(51) Int. Cl.

| | |
|---|---|
| *C08K 3/22* | (2006.01) |
| *B01J 23/00* | (2006.01) |
| *B01J 35/10* | (2006.01) |
| *C01F 7/16* | (2006.01) |
| *B01J 37/03* | (2006.01) |
| *B01J 37/10* | (2006.01) |
| *B01J 21/00* | (2006.01) |
| *B01J 35/00* | (2006.01) |

(52) U.S. Cl.
CPC ............... *C08K 3/22* (2013.01); *B01J 21/005* (2013.01); *B01J 23/005* (2013.01); *B01J 35/002* (2013.01); *B01J 35/0013* (2013.01); *B01J 35/1019* (2013.01); *B01J 35/1066* (2013.01); *B01J 37/033* (2013.01); *B01J 37/10* (2013.01); *C01F 7/16* (2013.01); *C01F 7/162* (2013.01); *C01F 7/164* (2013.01); *C01F 7/168* (2013.01); *C01P 2002/32* (2013.01); *C01P 2002/72* (2013.01); *C01P 2004/03* (2013.01); *C01P 2006/12* (2013.01); *C01P 2006/13* (2013.01); *C01P 2006/16* (2013.01); *C01P 2006/17* (2013.01); *Y10T 428/2982* (2015.01)

(58) Field of Classification Search
CPC ..... C08J 3/20; C08K 3/22; C08K 2003/2217; C08K 2003/2227; C08K 2003/2206; B01J 23/005; B01J 35/1019; B01J 35/1066; B01J 37/033; B01J 37/10; B01J 21/005; B01J 35/0013; B01J 35/002; C01F 7/162; C01F 7/164; C01F 7/168; C01F 7/16; Y10T 428/2982
USPC ........................................... 428/402; 524/436
See application file for complete search history.

(56) References Cited

U.S. PATENT DOCUMENTS

| | | | | |
|---|---|---|---|---|
| 3,880,776 | A * | 4/1975 | Box et al. ...................... | 502/329 |
| 5,219,816 | A * | 6/1993 | Zhou et al. .................... | 502/223 |
| 6,958,310 | B2 | 10/2005 | Wang et al. ................... | 502/327 |
| 8,304,367 | B2 * | 11/2012 | Takahashi et al. ............ | 502/335 |
| 2011/0097259 | A1 | 4/2011 | Del-Gallo et al. ......... | 423/648.1 |
| 2011/0105304 | A1 | 5/2011 | Del-Gallo et al. .............. | 502/74 |
| 2011/0105305 | A1 | 5/2011 | Del-Gallo et al. .............. | 502/74 |

FOREIGN PATENT DOCUMENTS

| | | | |
|---|---|---|---|
| EP | 0333559 | * | 9/1989 |
| WO | WO01/19514 | * | 3/2001 |
| WO | WO 01/19514 | | 3/2001 |

OTHER PUBLICATIONS

Adak et al. "Synthesis and characterization of MgAl2O4 spinel by PVA evaporation technique." Journal of Materials Science Letters; vol. 16, No. 3 (1997), 234-235.
Mehmet A. Gu"lgu"n et al. "Polymerized Organic—Inorganic Synthesis of Mixed Oxides." J. Am. Ceram. Soc., 82 [3] 556-60 (1999).
S. Li et al. "Synthesis and characterization of lanthanum aluminate powders via a polymer complexing plus combustion route." Materials Chemistry and Physics 132 (2012) 309-315.
R. Wang et al. "A novel method for the synthesis of nano-sized MgAl2O4 spinel ceramic powders." Journal of Ceramic Processing Research. vol. 11, No. 2, pp. 173-175 (2010).
J. Guo et al. "Dry reforming of methane over nickel catalysts supported on magnesium aluminate spinels." Applied Catalysis A: General 273 (2004) 75-82.
International Search Report PCT/IB2014/000788 dated Dec. 15, 2014.

* cited by examiner

*Primary Examiner* — Leszek Kiliman
(74) *Attorney, Agent, or Firm* — Norton Rose Fulbright US LLP

(57) ABSTRACT

High surface area alkaline earth aluminate spinel materials are disclosed, together with methods for the preparation thereof from one or more alkaline earth metal salts and a water soluble non-ionic polymer. A nanocrystalline alkaline earth metal aluminate spinel prepared according to the method is also provided.

20 Claims, 12 Drawing Sheets

| | MgAl2O4 | MgAl2O4+PAA | CaAl2O4 | CaAl2O4+PAA | MgCaAl2O4 | MgCaAl2O4+PAA |
|---|---|---|---|---|---|---|
| BET Surface Area: | 103.6752 m²/g | 120.9699 m²/g | 133.1490 m²/g | 146.1811 m²/g | 151.2525 m²/g | 157.2486 m²/g |
| BJH Adsorption cumulative surface area of pores between 1.7000 nm and 300.0000 nm diameter: | 103.073 m²/g | 135.340 m²/g | 138.107 m²/g | 153.611 m²/g | 163.760 m²/g | 169.559 m²/g |
| BJH Desorption cumulative surface area of pores between 1.7000 nm and 300.0000 nm diameter: | 131.2557 m²/g | 169.2420 m²/g | 158.5262 m²/g | 177.1341 m²/g | 191.2845 m²/g | 196.8458 m²/g |
| BJH Adsorption cumulative volume of pores between 1.7000 nm and 300.0000 nm diameter: | 0.342881 cm³/g | 0.398295 cm³/g | 0.454766 cm³/g | 0.453555 cm³/g | 0.336381 cm³/g | 0.416174 cm³/g |
| BJH Desorption cumulative volume of pores between 1.7000 nm and 300.0000 nm diameter: | 0.558055 cm³/g | 0.415198 cm³/g | 0.464242 cm³/g | 0.464866 cm³/g | 0.325217 cm³/g | 0.405461 cm³/g |
| Pore Size | | | | | | |
| BJH Adsorption average pore diameter (4V/A): | 21.0673 nm | 11.7717 nm | 13.1714 nm | 11.8105 nm | 82.164 Å | 98.118 Å |
| BJH Desorption average pore diameter (4V/A): | 17.0066 nm | 9.8131 nm | 11.7148 nm | 10.4998 nm | 68.007 Å | 82.392 Å |

FIG. 7

ALKALINE EARTH METAL ALUMINATE SPINELS AND METHODS FOR THE PREPARATION AND USE THEREOF

CROSS REFERENCE TO RELATED APPLICATIONS

This application claims the benefit of U.S. Provisional Application No. 61/773,507 filed Mar. 6, 2013. The contents of the referenced application(s) is incorporated into the present application by reference.

BACKGROUND OF THE INVENTION

A. Field of the Invention

The present invention relates to alkaline earth metal aluminate spinels, and methods for the preparation and use thereof.

B. Description of Related Art

High surface area (HSA) materials are used in a wide array of chemical processes. HSA materials are frequently made by producing small, porous materials. These porous materials can be made, for example, by precipitation from solution.

Thermally stable, high surface area mesoporous materials have been found applicable in catalysis, separation, sorption, sensing, and fuel cells, to name a few. In one technique, HSA mesoporous materials can be synthesized by precipitation from solution in the presence of surfactants as templating agents. Though synthesizing HSA metal oxides is an achievable task, the high surface areas are not easily maintained after high temperature calcination. Ideally, HSA metal oxide supports in industrial applications can facilitate high loading of active metals with a corresponding increase in the turn over frequency (TOF) of the chemical reaction. It would be desirable to have active metal loaded catalysts on an HSA material with enhanced activity, such that TOF values can be achieved with smaller reactor volumes.

While significant research and developments have been made in the area of HSA materials, such as, for example, spinels, there is still a need for improved materials that can retain all or a significant portion of their surface area after high temperature calcination. This need and other needs are satisfied by the compositions and methods of the present disclosure.

SUMMARY OF THE INVENTION

In summary, the present disclose generally relates to alkaline earth metal aluminate spinels, and methods for the preparation and use thereof.

In one aspect, the present disclosure provides a method for preparing an alkaline earth metal aluminate spinel, the method comprising forming an aqueous solution of an alkaline earth metal salt, aluminum nitrate, and polyacrylamide (herein also referred to as PAA); adjusting the pH of the aqueous solution to a value from about 9.5 to about 10.5 to form a precipitate; digesting the precipitate; and finally calcining the digested precipitate.

In another aspect, the present disclosure provides an alkaline earth metal aluminate spinel, prepared in accordance with the methods described herein.

In yet another aspect, the methods described herein for preparing an alkaline earth metal aluminate spinel can comprise any individual or combination of alkaline earth metal salts such as calcium salts, magnesium salts, and barium salts.

These and further advantages of the invention are discussed below. Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not meant to be restrictive.

BRIEF DESCRIPTION OF THE DRAWINGS

The accompanying drawings, which are incorporated in and constitute a part of this specification, illustrate several aspects described below.

FIG. 7 details $N_2$ physisorption results for six different samples containing Ca and Mg alkaline earth metal aluminates synthesized with and without PAA, in accordance with various aspects of the present disclosure.

DETAILED DESCRIPTION OF THE INVENTION

Figure 1:
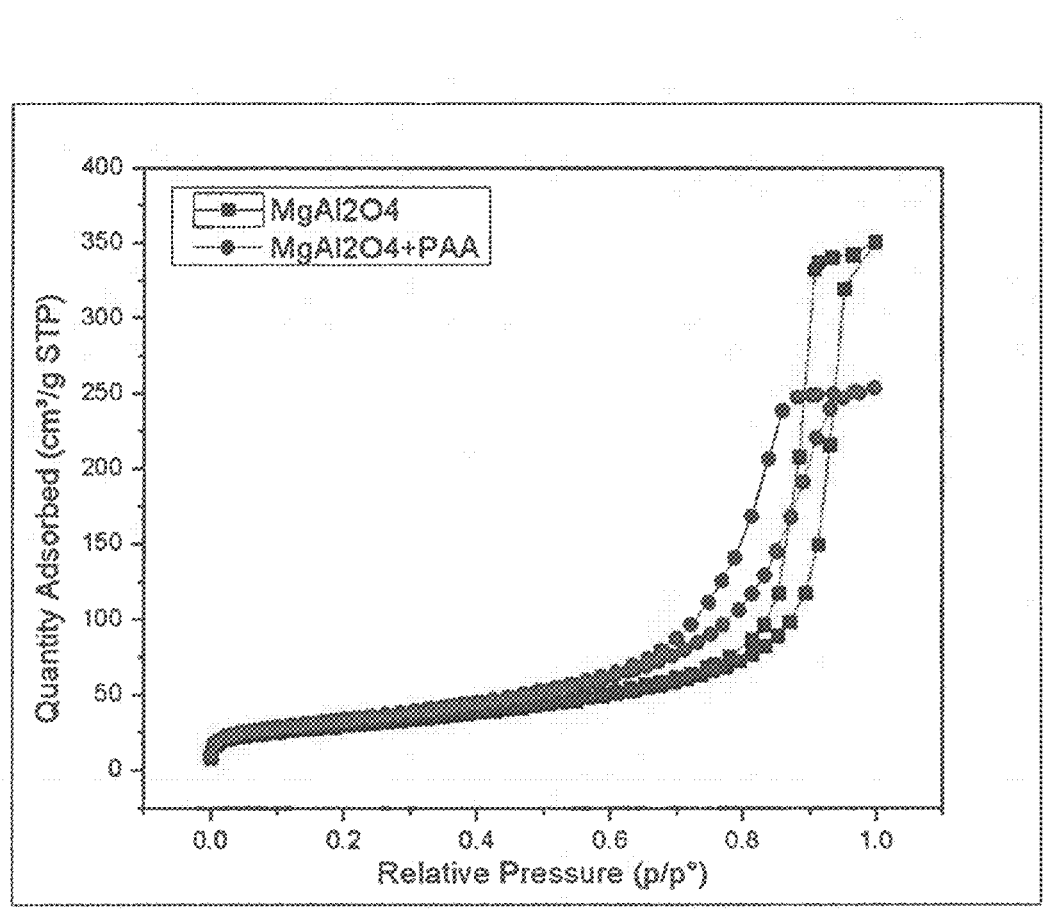
FIG. 1 illustrates the nitrogen adsorption/desorption isotherm for MgAl and MgAl/PAA samples calcined at 800° C., in accordance with various aspects of the present disclosure.

Before the present compounds, compositions, articles, devices, and/or methods are disclosed and described, it is to be understood that the aspects described below are not limited to specific synthetic methods, specific examples as such may, of course, vary. It is also to be understood that the terminology used herein is for the purpose of describing particular aspects only and is not intended to be limiting.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if alkaline earth metal salts are disclosed and discussed and a number of modifications that can be made to alkaline earth metal salts are discussed, each and every combination and permutation of the alkaline earth metal salts and their combinations that are possible are specifically contemplated unless specifically indicated to the contrary. Thus, if alkaline earth metals M1, M2, and M3 are disclosed as well as a class of anions A1 and A2 and an example of a combination molecule, M1A2 is disclosed, then even if each is not individually recited, each is individually and collectively contemplated. Thus, in this example, each of the combinations M1A1, M1A2, M2A1, M2A2, M3A1, and M3A2 are specifically contemplated and should be considered disclosed from disclosure of M1, M2, M3, A1, and A2 and the example combination M1A1. Likewise, any subset, combination or mixture of these is also specifically contemplated and disclosed. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

It must be noted that, as used in the specification and the appended claims, the singular forms "a," "an" and "the" include plural referents unless the context clearly dictates otherwise.

"Optional" or "optionally" means that the subsequently described event or circumstance can or cannot occur, and that the description includes instances where the event or circumstance occurs and instances where it does not.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

A weight percent of a component, unless specifically stated to the contrary, is based on the total weight of the formulation or composition in which the component is included.

As briefly described above, the present disclosure provides alkaline earth metal aluminate spinel materials. In one aspect, such spinel materials can be utilized as catalyst supports for various chemical reactions, for example, in steam and carbon dioxide reforming processes. The present disclosure also provides methods for the preparation and use of such spinel materials. In one aspect, the methods comprise the use of a water soluble non-ionic polymer, such as, for example, polyacrylamide (PAA) as a templating agent to form the resulting spinel material.

In one aspect, PAA has been used as a lubricant in the handling, for example, extrusion of already formed spinel materials, but is typically burned off during drying and/or calcining steps. In contrast, the present application utilizes PAA as a structure control agent during the earlier synthesis stage. In this aspect, the PAA can act as a templating and pore diameter tailoring agent. Moreover, if used in such an aspect, there is no need to add an additional lubricant when extruding, for example, pellets, of a final spinel material.

In various aspects, the basicity of metal oxides can be significant in $CO_2$ adsorption and in the suppression of carbon deposition on the catalyst surface. In one aspect, the addition of an alkaline earth metal, such as, for example, magnesium, can enhance the basicity of the resulting material, improving the suppression of carbon deposition. To date, traditional alkaline earth spinel materials suffer from one or more of low surface area, poor thermal stability, poor mechanical strength, and/or broad pore size distribution.

In one aspect, the alkaline earth aluminate spinel materials of the present invention can exhibit high surface areas, even after calcination at high temperatures of, for example, about 800° C.

In general, the methods of the present disclosure provide for the precipitation of one or more at least partially water soluble alkaline earth metal salts in the presence of a water soluble, non-ionic polymer, such as, for example, PAA. The resulting slurry can then be digested to provide a high surface area mono or mixed alkaline earth aluminate spinel having the general formula $MAl_2O_4$, wherein M comprises barium, calcium, or magnesium; or $M_1M_2Al_2O_4$, wherein $M_1M_2$ comprises, MgCa, MgBa, or BaCa.

In one embodiment, the method for the preparation of an alkaline earth aluminate spinel comprises: contacting an alkaline earth metal salt or a solution thereof, aluminum nitrate, and polyacrylamide to form a solution; adjusting the pH of the solution to a value from about 9.5 to about 10.5 to form a precipitate; digesting the precipitate; and calcining the digested precipitate.

Alkaline earth metals, such as, for example, beryllium, magnesium, calcium, strontium, barium, and radium, typically have a plus 2 charge as a cation. Water soluble salts of these divalent cations exist if the anionic counter ion is appropriate. The solubility of the cation-anion pair can vary from one pair to another. In one aspect, the alkaline earth nitrate salts are typically at least partially soluble in water. In another aspect, other soluble alkaline earth compounds, such as, for example, alkaline earth hydroxides, exist and can be utilized with the methods of the present disclosure. Thus, for the purposes of this disclosure, an alkaline earth metal salt, in one aspect, can comprise an oxide, hydroxide, or combination thereof, in addition to or in lieu of a salt having a differing anion, provided that such alkaline earth compounds are suitable for use in the methods of the present disclosure.

In various aspects, the alkaline earth metal salt can comprise any one or more alkaline earth metals that are at least partially water soluble. In another aspect, the alkaline earth metal salt can comprise barium, calcium, magnesium, or a combination thereof. In other aspects, the alkaline earth metal salt can comprise other alkaline earth metals in lieu of or in addition to any alkaline earth metals specifically recited herein. In yet another aspect, the alkaline earth metal salt can comprise a nitrate, such as, for example, barium nitrate, calcium nitrate, magnesium nitrate, or a combination thereof.

In one aspect, a single alkaline earth metal salt can be utilized. In another aspect, multiple, for example, two, three, or more, individual alkaline earth metal salts of the same or varying metals can be used. In yet another aspect, if multiple alkaline earth metal salts are utilized, any two or more of such salts can be precipitated sequentially or be co-precipitated (i.e., simultaneously or substantially simultaneously). In one aspect, two or more alkaline earth metal salts are co-precipitated.

In one aspect, the one or more soluble alkaline earth salts can be combined with water to form an alkaline earth metal solution. In one aspect, the salt comprises an alkaline earth metal nitrate, although any water soluble alkaline earth metal salt is suitable. Examples of alkaline earth metal solutions include but are not limited to aqueous solutions of magnesium nitrate, calcium nitrate, barium nitrate, calcium hydroxide, barium hydroxide, and hydrates thereof. In another aspect, the alkaline earth metal salt solutions can be used directly if already present. An alkaline earth metal salt solution can be a solution containing any combination of alkaline earth metal salts. For example, an alkaline earth metal salt solution of magnesium nitrate and barium nitrate can form one possible combination. When mixed, alkaline earth metal salts are present in the solution, the precipitation, which is discussed later, can produce mixed alkaline earth metal aluminate spinels. In another aspect, the mixed alkaline earth metal solution can comprise salts selected from magnesium, calcium, and barium. Thus, any combination of magnesium with calcium, magnesium with barium, calcium with barium, or magnesium with barium and calcium can be used in the solution from which the alkaline earth or mixed alkaline earth metal aluminate spinel is to be formed. In another aspect, mixed alkaline earth metals are not required and an individual alkaline earth metal salt solution containing only one of magnesium, calcium, or barium can be used. It should be noted, however, that unless indicated to the contrary herein, alkaline earth metal aluminate spinel refers both to individual alkaline earth metal aluminate spinels containing only one kind of alkaline earth metal (e.g., one of the following alkaline earth metals as cations Mg, Ca, Ba) and to mixed alkaline earth metal aluminate spinels containing any combination of alkaline earth metals (e.g., cations of Mg and Ca, Mg and Ba, and Ca and Ba).

The alkaline earth metal salt or a solution thereof can be combined with a water soluble aluminum containing salt, such as, for example, aluminum nitrate, in the presence of the water soluble non-ionic polymer. A solution of aluminum nitrate can be prepared or used directly. The aluminum salt, such as, for example, aluminum nitrate can be combined with the soluble alkaline earth salt in solution to make a combined solution with the aluminum and the alkaline earth metal, or alternatively, the soluble alkaline earth salt can be added to the solution of the aluminum salt.

The water soluble non-ionic polymer of the present disclosure can be used as a templating or structure control agent in the formation of a desired spinel material. In one aspect, the water soluble non-ionic polymer comprises polyacrylamide, and/or derivatives or analogues thereof. In a specific aspect, the water soluble non-ionic polymer comprises polyacrylamide, such as, for example, a polyacrylamide having a molecular weight of from about 5,000,000 to about 6,000,000, available from Sigma-Aldrich. In one aspect, polyacrylamide solutions can be prepared by for example dissolving powdered polyacrylamide in water or by any other suitable method as is known in the art. Polyacrylamide or a solution thereof can then be added to the combined solution of the aluminum with the alkaline earth metal. Alternatively, polyacrylamide can be added to each of the alkaline earth metal and the aluminum solutions separately, or the polyacrylamide could be added to either one of the alkaline earth metal or aluminum solutions. Regardless of the order of addition, mixing, or contacting the polyacrylamide, the alkaline earth metal salt, and the aluminum salt together, a combined aqueous solution prior to precipitation will include all of these components (i.e., the polyacrylamide, the alkaline earth metal salt, and the aluminum salt).

In one aspect, the ratio of the amount of metal precursor, such as, for example, any one or more alkaline earth metal salts and the aluminum salt, to polymer can vary. In various aspects, the amount of metal precursor, for example, including the aluminum salt, can be expressed as the (weight of metal precursor)/(weight to polymer), and can range from about 10 to about 400, for example, about 10, 15, 20, 25, 30, 35, 40, 45, 50, 55, 60, 65, 70, 75, 80, 90, 100, 120, 140, 160, 180, 200, 220, 240, 260, 280, 300, 320, 340, 360, 380, or 400; or from about 30 to about 350, for example, about 30, 35, 40, 45, 50, 55, 60, 65, 70, 75, 80, 90, 100, 120, 140, 160, 180, 200, 220, 240, 260, 280, 300, 320, 340, or 350. In other aspects, the weight of metal precursor to weight of polymer can be about 36, 50, 84, 168, or 336. In other aspects, the weight of metal precursor to weight of polymer can range from about 20 to about 120, from about 20 to about 100, from about 30 to about 90, from about 40 to about 60, from about 70 to about 90, or from about 20 to about 50.

In one aspect, the respective amounts of any one or more alkaline earth metal salts and the aluminum salt, or solutions thereof, can be stoichiometric or approximately stoichiometric. In another aspect, any one or more of the alkaline earth metal salts and the aluminum salt, or solutions thereof, can be provided in an excess. In yet another aspect, the ratio of any one or more alkaline earth metal salts, or solutions thereof, can be less than or greater than a stoichiometric amount so as to provide a resulting spinel material having a desired chemistry. One of skill in the art, in possession of this disclosure, could readily determine any appropriate amount of alkaline earth metal salt and aluminum salt for a desired spinel material.

Furthermore, the resulting concentration of the combined salts can be at the same or different concentrations. For example, each of the alkaline earth metal concentrations and the aluminum salt concentration can be about 1 Molar (M) or any other concentration such that after pH adjustment, a precipitate is formed. In one aspect, equimolar amounts of the aluminum salts and the alkaline earth metal salts are prepared in the combined solution, the concentrations of the respective alkaline earth metal and the aluminum salts need not be equimolar; for example the alkaline earth metal salt can be at 0.5 M and the aluminum salt can be at 0.6 M in the combined solution. Furthermore, when mixed alkaline earth metal salts are used, the combined molarity of each of alkaline earth metal salt can be equimolar with the aluminum salt. For example, if 0.5 M $Ca(NO_3)_2$ and 0.5 M $Mg(NO_3)_2$ is present in the combined solution of alkaline earth metal salts, the aluminum salt has a concentration of 1 M.

Once the aqueous solution of aluminum salt, alkaline earth salts, and PAA is formed, the pH of the aqueous solution can be adjusted. In one aspect, the pH is adjusted to have a value from about 9.5 to about 10.5, for example, about 9.5, 9.6, 9.7, 9.8, 9.9, 10, 10.1, 10.2, 10.3, 10.4, or 10.5 to form a precipitate. In another aspect, the pH is adjusted to value of between about 9.8 and 10, for example, 9.8, 9.85, 9.9, 9.95, or 10.

The pH can be adjusted using any base suitable for use in the present invention. In various aspects, the base can be adjusted by the addition of chemicals, such as, for example, ammonia, urea, or a combination thereof. In one aspect, ammonia or ammonium hydroxide can be used. In such an aspect, the ammonia or ammonium hydroxide can be slowly added in increments. Addition of the ammonia can be conducted slowly over time to the combined solution of the aluminum salt, the alkaline earth or mixed alkaline earth salts, and the PAA, so that a precipitate of the alkaline earth or mixed alkaline earth metal salts with the aluminum in the presence of PAA forms an alkaline earth aluminate (or mixed alkaline earth aluminate) having a high surface area. In another aspect, urea or a solution thereof can be used. In such an aspect, the alkaline earth or mixed alkaline earth salts, and the PAA, via a hydrothermal process. In such a hydrothermal process, the precipitation can be performed at a temperature of from about 125° C. to about 175° C., for example, under pressure of 10-120 bar. In another aspect, a hydrothermal process can be performed at a temperature of about 150° C. under pressure.

After a precipitate has been formed, the resulting slurry can optionally be stirred or agitated prior to digestion. In one aspect, the slurry can be agitated for at least about 1 hour prior to digestion.

The precipitate or slurry containing the precipitate can then be digested. In one aspect, digestion can be performed in, for example, a water bath at a temperature of about 80° C. In another aspect, digestion can be performed at a temperature less than or greater than any temperature specifically recited herein, and one of skill in the art could readily determine an appropriate digestion time and temperature. In yet another aspect, digestion of the slurry can be carried out over extended periods of time of 12 hours or more.

After digestion, the precipitate can be separated from the supernatant liquid. Separation of the precipitate from the supernatant liquid can be accomplished by any of a variety of mechanisms such as decanting, filtration, and centrifugation. In one aspect, the separated precipitate can optionally be washed to remove salts or water other soluble components from the precipitate. In another aspect, the precipitate is not washed.

Once the precipitate has been separated, it can optionally be extruded to form, for example, pellets which may be desired in industrial processes.

In one aspect, the precipitate can be dried prior to calcining. In one aspect, the precipitate can be partially dried prior to calcining. In another aspect, the precipitate can be dried or substantially dried prior to calcining. In yet another aspect, the precipitate can be calcined from a wet or cake form. Calcining can be accomplished by heating the precipitate at a temperature of at least about 500° C., for example, about 500, 525, 550, 575, 600, 625, 650, 675, 700, 725, 750, 775, 800, 825, 850, 875, 900, 925, 950, 975, 1,000, or more. In one aspect, calcining can be performed at a temperature of about 800° C., for example, for about 8 hours. In one aspect, the precipitate can be calcined at a temperature of about 400° C. or more. In another aspect, the precipitate can be calcined at a temperature of about 550° C. or more, for example, about 550, 600, 650, 700, 750, 800, 850, 900° C., or more. In another aspect, the precipitate can be heated at a temperature of about 800° C. or more, for example, about 800, 825, 850, 875, 900, 925, 950° C., or more. In another aspect, the precipitate can be calcined at a temperature of about 800° C. In one aspect, a spinel comprising MgAl can be calcined at a temperature of about 550° C. In yet another aspect, a spinel comprising CaAl, MgCaAl, or a combination thereof, can be calcined at a temperature of about 800° C. In one aspect, a furnace can be used to calcine the precipitate, such that an alkaline earth metal aluminate spinel and/or a mixed alkaline earth metal aluminate spinel is formed. In one aspect, the process of calcining can burn off lubricants, remove volatile components, and/or decompose components (e.g., organic compounds).

In one aspect, the methods described herein can involve any individual or combination of alkaline earth metal salts such as calcium salts, magnesium salts, and barium salts. In other aspects, other alkaline earth metal salts can be used.

In one aspect, the methods described herein can provide a nanocrystalline alkaline earth metal aluminate. The resulting calcined alkaline earth metal spinel can have a surface area of at least about 120 $m^2$/g. In another aspect, the calcined alkaline earth metal aluminate spinel can have any one alkaline earth metal present (e.g., Mg, Ca, and Ba) or any combination of alkaline earth metals present (e.g., Mg and Ca, Mg and Ba, and Ca and Ba). In yet another aspect, the alkaline earth metal spinel can have a surface area of at least about 120 $m^2$/g after being calcined at, for example, about 800° C. In such an aspect, the resulting alkaline earth metal aluminate can comprise a nanocrystalline alkaline earth metal aluminate spinel.

The alkaline earth aluminate spinel material prepared in accordance with the methods described herein can exhibit a high surface area, such as, for example, about 100, 110, 120, 125, 130, 135, 140, 145, 150, 155 $m^2$/g, or more. In another aspect, the resulting alkaline earth aluminate spinel material can maintain all or a substantial portion of such surface area after calcination. In one aspect, the alkaline earth aluminate spinel material can maintain at least about 75%, 80%, 85%, 90%, 95%, or more of its original surface area after calcination.

In another aspect, the methods described herein can provide a spinel material having a desirable pore size distribution. While not wishing to be bound by theory, the porosity and pore size distribution of a catalyst support, such as, for example, a spinel material, can significantly influence the selectivity achieved in a given chemical reaction. In one aspect, the pore diameter of an alkaline earth metal aluminate spinel, prepared in accordance with the methods of the present disclosure, after calcining at 800° C., can range from about 100 nm to about 110 nm.

Thus, this disclosure describes a variety of aspects of the present invention. While not intended to be limiting, the invention can be specifically described in any one or more of the following aspects:

Aspect 1: A method for the preparation of an alkaline earth aluminate spinel, the method comprising: a) contacting an alkaline earth metal salt or a solution thereof, aluminum nitrate or a solution thereof, and polyacrylamide or a solution thereof to form a first solution; b) adjusting the pH of the first solution to a value from about 9.5 to about 10.5 to form a precipitate; c) digesting the precipitate; and d) drying and calcining the digested precipitate.

Aspect 2: The method of aspect 1, wherein step a) comprises: forming a combined solution of the alkaline earth metal salt and the aluminum nitrate, and mixing with an aqueous solution of polyacrylamide.

Aspect 3: The method of any preceding aspect, wherein the alkaline earth metal salt and the aluminum nitrate are equimolar.

Aspect 4: The method of any preceding aspect, wherein the alkaline earth metal salt comprises at least two different alkaline earth salts selected from the group consisting of: a magnesium salt, a calcium salt, and a barium salt.

Aspect 5: The method of any preceding aspect, wherein the alkaline earth metal salt is selected from the group consisting of: a magnesium salt, a calcium salt, a barium salt, a combination of a magnesium salt and a calcium salt, a combination of a magnesium salt and a barium salt, and a combination of a barium salt and a calcium salt.

Aspect 6: The method of aspect 5, wherein the alkaline earth salt has a total alkaline earth metal concentration of about 1 M.

Aspect 7: The method of any preceding aspect, wherein the step of adjusting the pH is accomplished by adjusting the pH to a value from about 9.8 to about 10.0.

Aspect 8: The method of any preceding aspect, wherein the step of adjusting the pH comprises adding ammonium hydroxide.

Aspect 9: The method of any preceding aspect, wherein prior to the step of digesting, the precipitate is agitated for at least about one hour.

Aspect 10: The method of any preceding aspect, wherein the step of digesting the precipitate comprises heating the precipitate in a water bath at a temperature of about 80° C. for at least about 12 hours.

Aspect 11: The method of any preceding aspect, wherein after the step of digesting, the precipitate is separated, washed, and dried prior to the step of calcining.

Aspect 12: The method of any preceding aspect, wherein the precipitate is separated from a supernatant liquid using a centrifuge.

Aspect 13: The method of any preceding aspect, wherein the step of adjusting the pH comprises adding a pH adjuster, the pH adjuster being selected from the group consisting of: urea, a solution of urea, ammonia, ammonium hydroxide, and combinations thereof.

Aspect 14: The method of aspect 13, wherein the step of adjusting the pH comprises adding urea and heating to a temperature of from about 125° C. to about 175° C. under about equilibrium vapor pressure conditions (<120 bars).

Aspect 15: The method of any preceding aspect, wherein the alkaline earth metal salt is contacted with the polyacrylamide prior to formation of the precipitate.

Aspect 16: A nanocrystalline alkaline earth metal aluminate spinel prepared according to the method of any preceding aspect.

Aspect 17: The nanocrystalline alkaline earth metal aluminate spinel of aspect 16, having a surface area of at least about 120 $m^2/g$ after calcination at a temperature of 800° C.

Aspect 18: The nanocrystalline alkaline earth metal aluminate spinel of aspect 16, having a surface area from about 120 $m^2/g$ to about 160 $m^2/g$ after calcination at a temperature of 800° C.

Aspect 19: The nanocrystalline alkaline earth metal aluminate spinel of aspect 16, having a surface area of from about 120 $m^2/g$ to about 145 $m^2/g$ after calcination at a temperature of 800° C.

Aspect 20: The nanocrystalline alkaline earth metal aluminate spinel of aspect 16, having a pore diameter after calcining of from about 100 nm to about 110 nm.

In other aspects, one or more catalytic metals can be deposited on the surface of the resulting spinel material so as to form a catalyst. The deposition of catalytic metals on the surface of the resulting spinel material can be carried out using any method that is known in the art for depositing such catalytic materials on similar types of materials. In various aspects, such a catalyst can exhibit a retained high surface area to enable higher loadings of the catalytic metals than on conventional spinel materials. In other aspects, the resulting spinel material can also exhibit one or more of improved thermal stability, improved mechanical strength, and a narrow pore size distribution, as compared to conventional spinel materials.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process.

Example 1

Synthesis Procedure for Polymer Templated $MgAl_2O_4$

In a first example, equimolar solutions of an alkaline earth metal salt (12.81 g $Mg(NO_3)_2.6H_2O$ in 50 ml of $H_2O$) and aluminium nitrate (37.51 g $Al(NO_3)_3.9H_2O$ in 50 mL of $H_2O$) were mixed in a 500 mL beaker. To this mixture, 0.3 g of polyacrylamide (PAA), dissolved in 50 mL of $H_2O$, was added. To this solution, 27% v/v ammonium hydroxide solution was added drop wise under vigorous stirring till the pH of the slurry reached 9.8-10. After the completion of precipitation, stirring was continued for 1 hour. Thereafter, the precipitated slurry was digested in a water bath for 12 hours at 80° C. The residue was separated by centrifugation, washed six times with 200 mL portions of water to eliminate any residual ions. The residue was dried at 120° C. for 12 hours followed by calcination at 800° C. for 8 hours.

For the mixed alkaline earth metal aluminates, 0.5 M solutions of each of alkali metal salt were used instead of 1 M. For comparative purpose all the mono- and bi-alkaline earth metal aluminates were also synthesized in the absence of polymer and the results compared. $Ba(NO_3)_2$, and $Ca(NO_3)_2.4H_2O$ were used as sources for Ba and Ca respectively. Table 1 summarizes the different oxides synthesized and their codes.

TABLE 1

Metal oxide codes, their composition and theoretical & experimental yields

| Sample | Composition | Theoretical yield, g | Experimental yield, g |
|---|---|---|---|
| MgAl/PAA | $MgAl_2O_4$ + PAA* | 7.1 | 6.5 |
| CaAl/PAA | $CaAl_2O_4$ + PAA* | 6.57 | 5.4 |
| BaAl/PAA | $BaAl_2O_4$ + PAA* | 5.2 | 4.6 |
| MgCaAl/PAA | $MgCaAl_2O_4$ + PAA* | 5.1 | 4.5 |
| MgBaAl/PAA | $MgBaAl_2O_4$ + PAA* | 4.68 | 4.2 |
| BaCaAl/PAA | $BaCaAl_2O_4$ + PAA* | 4.6 | 4.4 |
| MgCaAl | $MgCaAl_2O_4$** | 5.1 | 4 |
| MgBaAl | $MgBaAl_2O_4$** | 4.68 | 4 |
| BaCaAl | $BaCaAl_2O_4$** | 4.6 | 4.3 |
| MgAl | $MgAl_2O_4$** | 7.1 | 6.3 |
| CaAl | $CaAl_2O_4$** | 6.57 | 5 |
| BaAl | $BaAl_2O_4$** | 5.2 | 4.8 |

Note:
*metal oxides synthesized using PAA template;
**metal oxides synthesized without PAA template
PAA = poly acrylamide $N_2$ physisorption experiments were conducted using a surface area and porosity analyzer supplied by Micromeritics, model ASAP 2420. FIG. 7 summarizes the results for six different aluminate samples synthesized in the presence and absence of PAA. The results indicate that metal oxide samples synthesized using PAA have surface areas higher than the equivalent metal oxide samples made without PAA. In the case of $MgAl_2O_4$, the surface area increased from 103.6 m²/g synthesized without PAA to 121 m²/g synthesized with PAA. Similarly, in the case of $CaAl_2O_4$, the surface area increased from 133 m²/g synthesized without PAA to 146 m²/g synthesized with PAA. In the case of $MgCaAl_2O_4$, the surface area increased from 151.2 m²/g synthesized without PAA to 157.2 m²/g synthesized with PAA. The adsorption and desorption surface area of pores between 1.7-300 nm in diameter, as calculated by BJH method, shows that surface area of pores increases dramatically in the case of PAA assisted synthesis. However, the volume of pores measured by adsorption/desorption of $N_2$ by BJH method indicated that pore volume remained almost the same with or without PAA.

Figure 4:
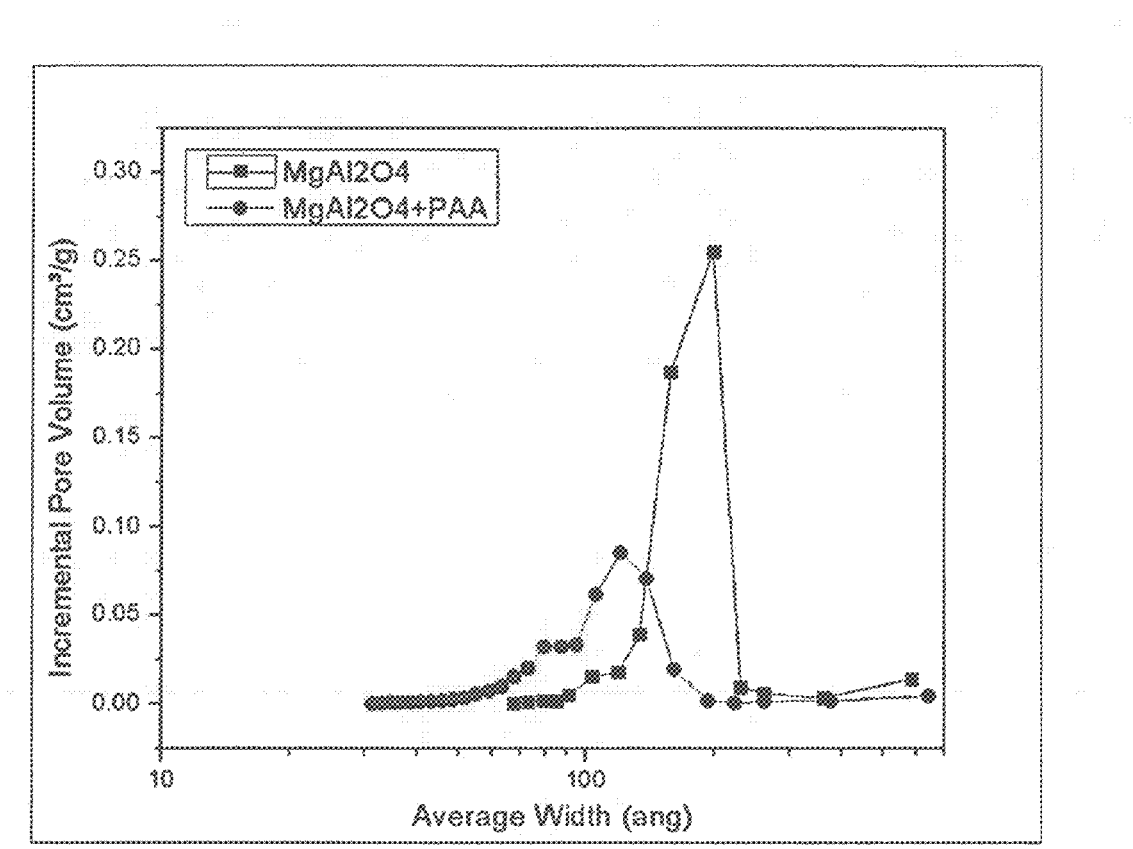
FIG. 4 illustrates the pore size distribution of MgAl and MgAl/PAA samples calcined at 800° C., obtained using the BJH desorption method, in accordance with various aspects of the present disclosure.
Figure 5:
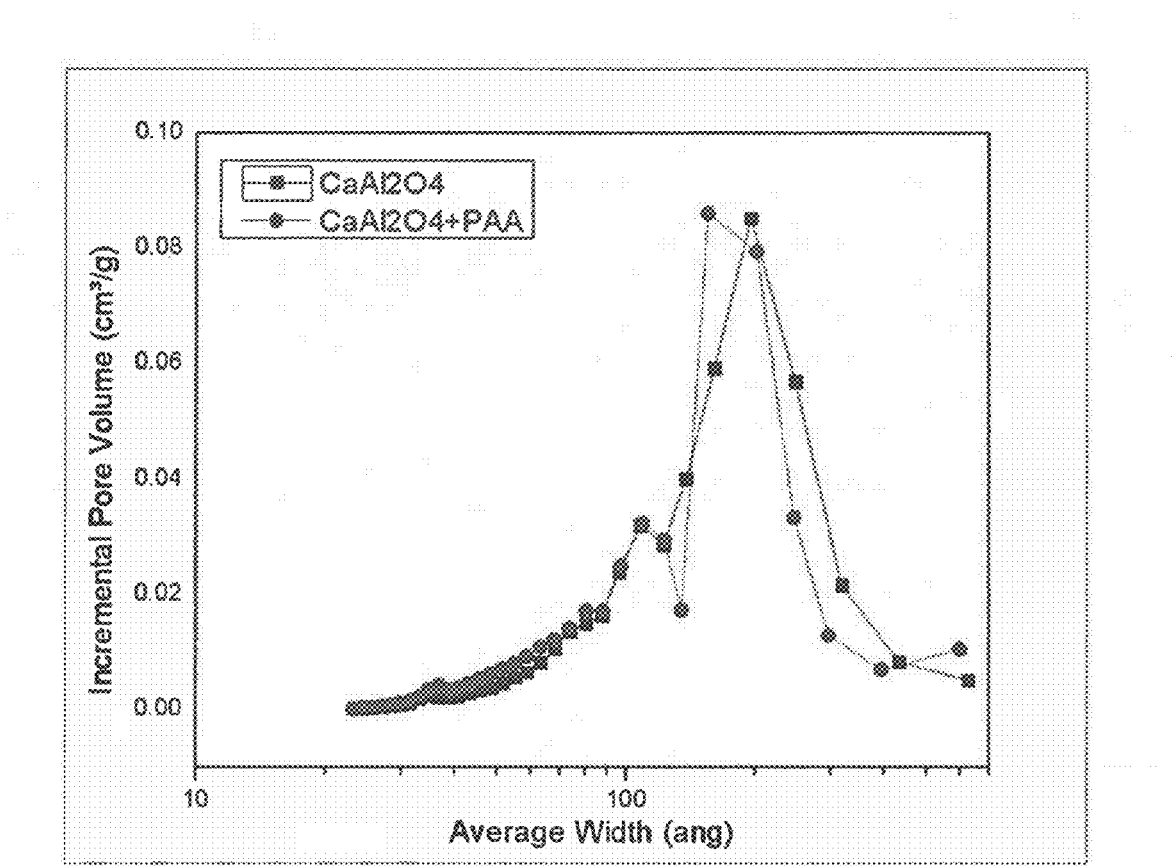
FIG. 5 illustrates the pore size distribution of CaAl and CaAl/PAA samples calcined at 800° C., obtained using the BJH desorption method, in accordance with various aspects of the present disclosure.
Figure 6:
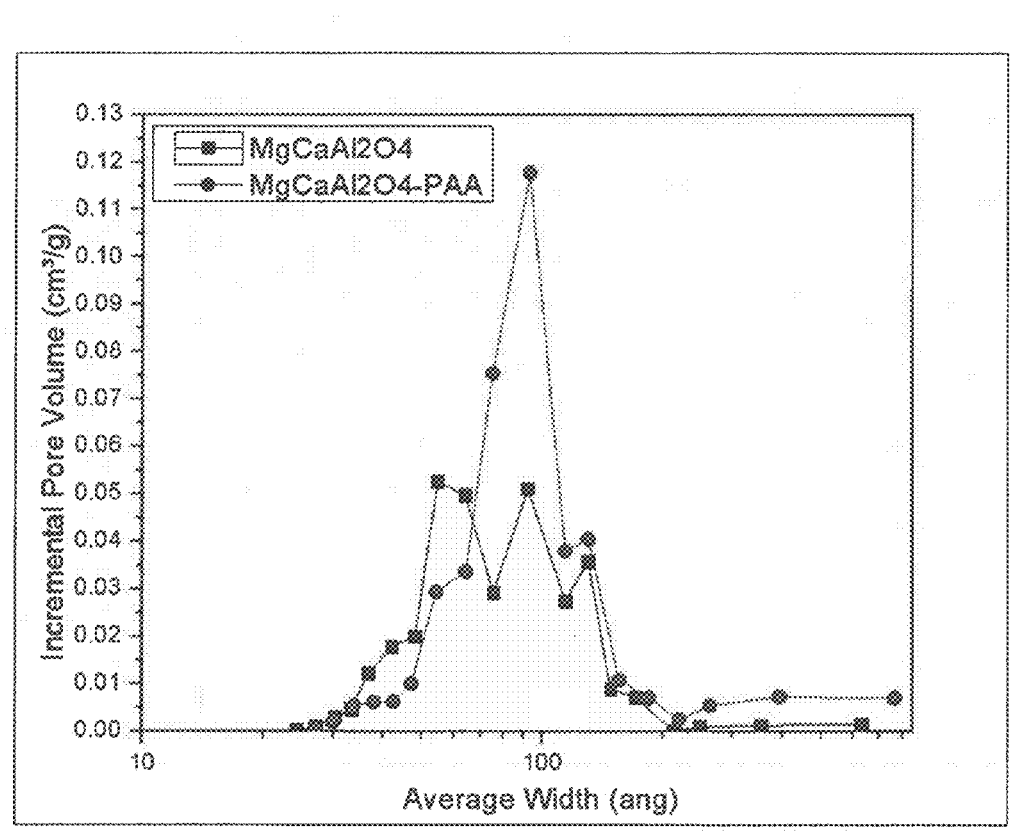
FIG. 6 illustrates the pore size distribution of MgCaAl and MgCaAl/PAA samples calcined at 800° C., obtained using the BJH desorption method, in accordance with various aspects of the present disclosure.

Another important improvement using PAA is observed in the average pore diameter of metal oxides. FIGS. 4-6 shows the pore size distribution of the 800° C. calcined MgAl&MgAl/PAA, CaAl&CaAl/PAA and MgCaAl&MgCaAl/PAA samples respectively. While considering BJH adsorption average pore diameter, it can be observed that PAA shows greater effect and tunes the final pore diameter around 100-110 nm. We have seen similar effects with BaAl/PAA, MgBaAl/PAA, BaCaAl/PAA, BaAl, MgBaAl and BaCaAl. PAA tailors the pore size around 100-110 nm whether the pore diameter of metal oxides lies either below or above that region of aluminate spinels. This clearly indicates the advantage in employing PAA as template for metal oxide synthesis.

Figure 2:
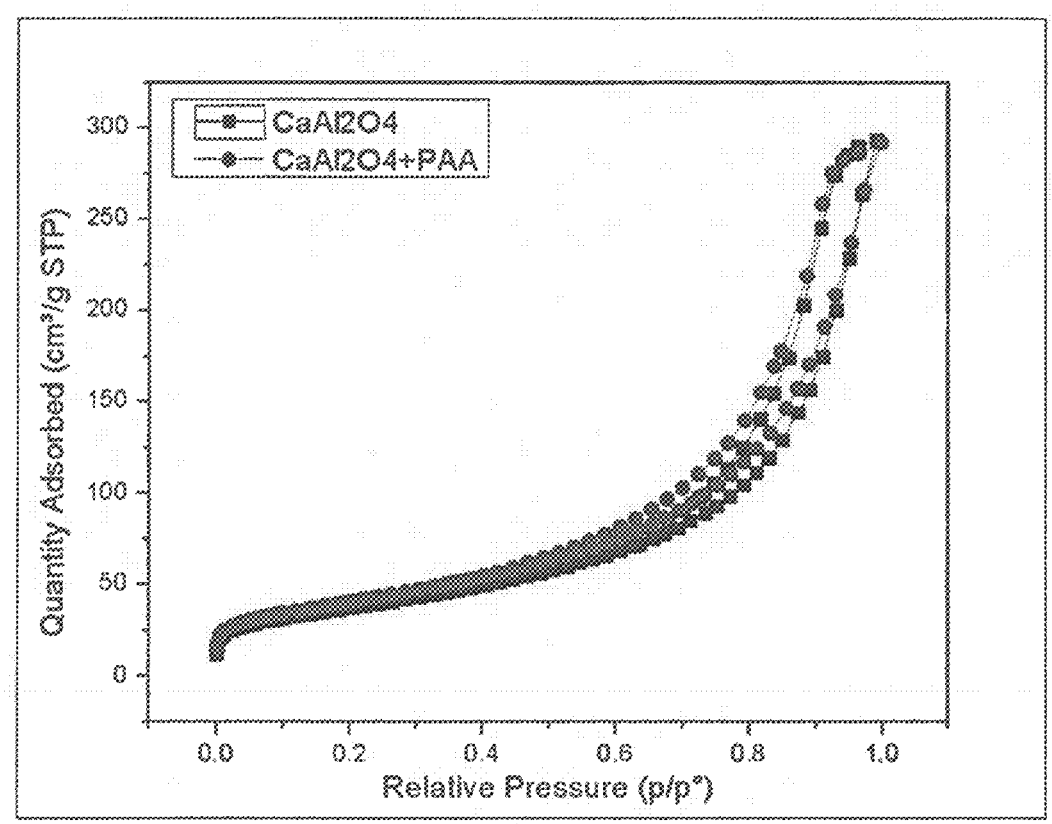
FIG. 2 illustrates the nitrogen adsorption/desorption isotherm for CaAl and CaAl/PAA samples calcined at 800° C., in accordance with various aspects of the present disclosure.
Figure 3:
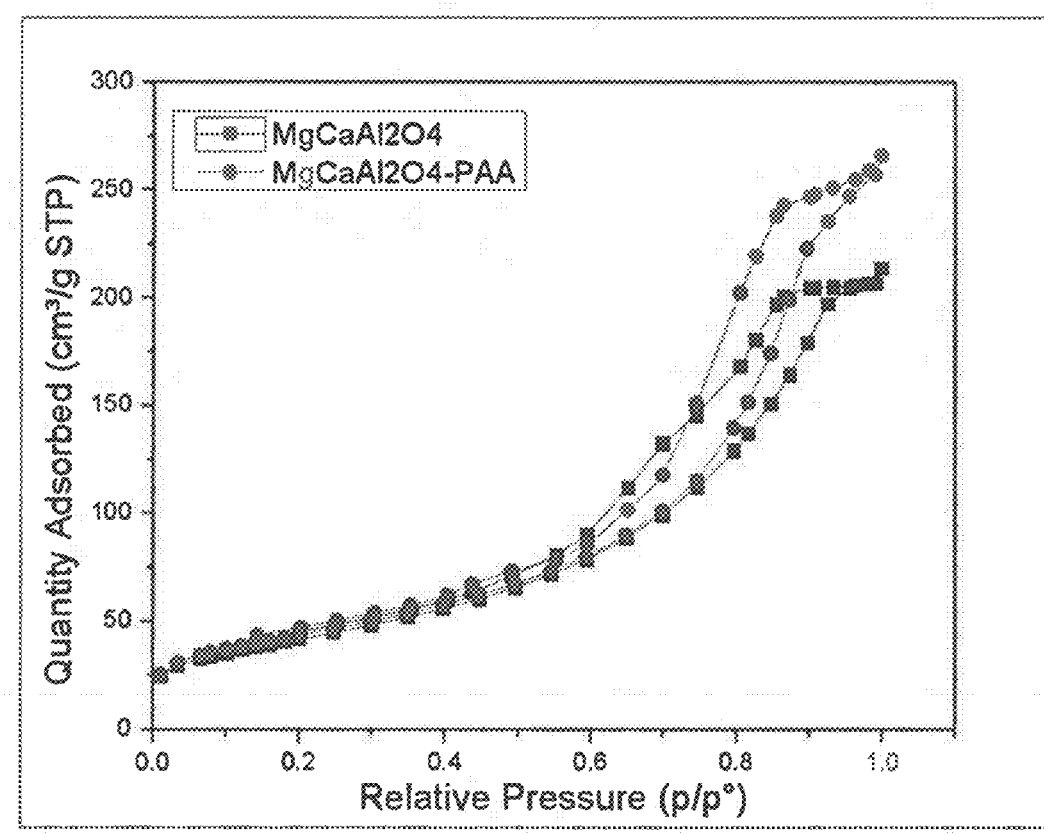
FIG. 3 illustrates the nitrogen adsorption/desorption isotherm for MgCaAl and MgCaAl/PAA samples calcined at 800° C., in accordance with various aspects of the present disclosure.

The $N_2$ adsorption-desorption isotherm for alkaline earth aluminates synthesized in the presence and absence of PAA are given in FIGS. 1-3. All samples were calcined at 800° C. for 8 hours. Their isotherms indicate a Type IV isotherm with an $H_2$ hysteresis loop based on IUPAC classifications [K. S. W. Sing, Pure Appl. Chem. 54 (1982) 2201]. This type of hysteresis is associated with capillary condensation in mesopores and a limiting uptake over a range of high P/P0. The $H_2$ loop indicates that pores are of ink bottle shape. Co-precipitation in the presence of PAA did not alter the hysteresis shape, indicating that pore shape has been maintained during and after the digestion process.

Example 2

Spinel Synthesis Using Hydrothermal Techniques

In a second example, the spinel systems listed in Table 2, below, were synthesized using a hydrothermal technique. For each sample, 5 ml of a 0.5 M solution of the respective metal nitrate precursor(s) and 10 ml of a 1 M aluminum nitrate precursor solution were mixed in a 200 ml glass beaker. About 8.4 g of urea was added to the metal precursor solution and stirred. For polymer treated samples, about 0.3 g of PAA (Sigma 92560 Polyacrylamide, M.Wt. 5,000,000-6,000,000) was added to the above solution and stirred until the polymer dissolved completely. The clear solution was then transferred to a Teflon liner and then sealed in an autoclave. The autoclave was then placed in a hot air oven at 150° C. for 24 hours. After the reaction, the samples were cooled to room temperature, filtered and washed several times with water. Thereafter, the samples were dried at 120° C. for 10 hours and calcined at 800° C. for 8 hours.

The effect of reaction time was also studied for $MgAl_2O_4$ by subjecting the reaction mixture to hydrothermal conditions for 1 h, 2 hours and 3 hours at 150° C. Table 2 details the surface area of the spinels synthesized in this example by hydrothermal treatment at 150° C. at various times.

TABLE 2

BET surface area of different samples synthesized by hydrothermal route

| ID | Sample | Hydrothermal synthesis at 150° C., reaction time in hours (h) | BET surface area (m²/g) |
|---|---|---|---|
| 1 | $MgAl_2O_4$ + polymer | 1 | 85 |
| 2 | $MgAl_2O_4$ + polymer | 2 | 91 |
| 3 | $MgAl_2O_4$ + polymer | 3 | 93 |
| 4 | $MgAl_2O_4$ | 24 | 112 |
| 5 | $MgAl_2O_4$ + polymer | 24 | 108 |
| 6 | $CaAl_2O_4$ | 24 | 42 |
| 7 | $CaAl2O4$ + polymer | 24 | 24 |
| 8 | $BaAl_2O_4$ | 24 | 20 |
| 9 | $BaAl_2O_4$ + polymer | 24 | 20 |

The data in Table 2 illustrates that metal alkoxides treated with polymer at about 150° C. for 24 hours exhibited lower surface areas than comparable samples prepared without polymer. In addition, the surface area of $MgAl_2O_4$ samples did not improve if the reaction time was decreased from 24 hours to 1, 2, or 3 hours; however, a clear trend is discernable wherein the surface area increases if the reaction time is increased from 1 hour to 24 hours.

Example 3

Analysis of Samples Made without and with PAA

Figure 8:
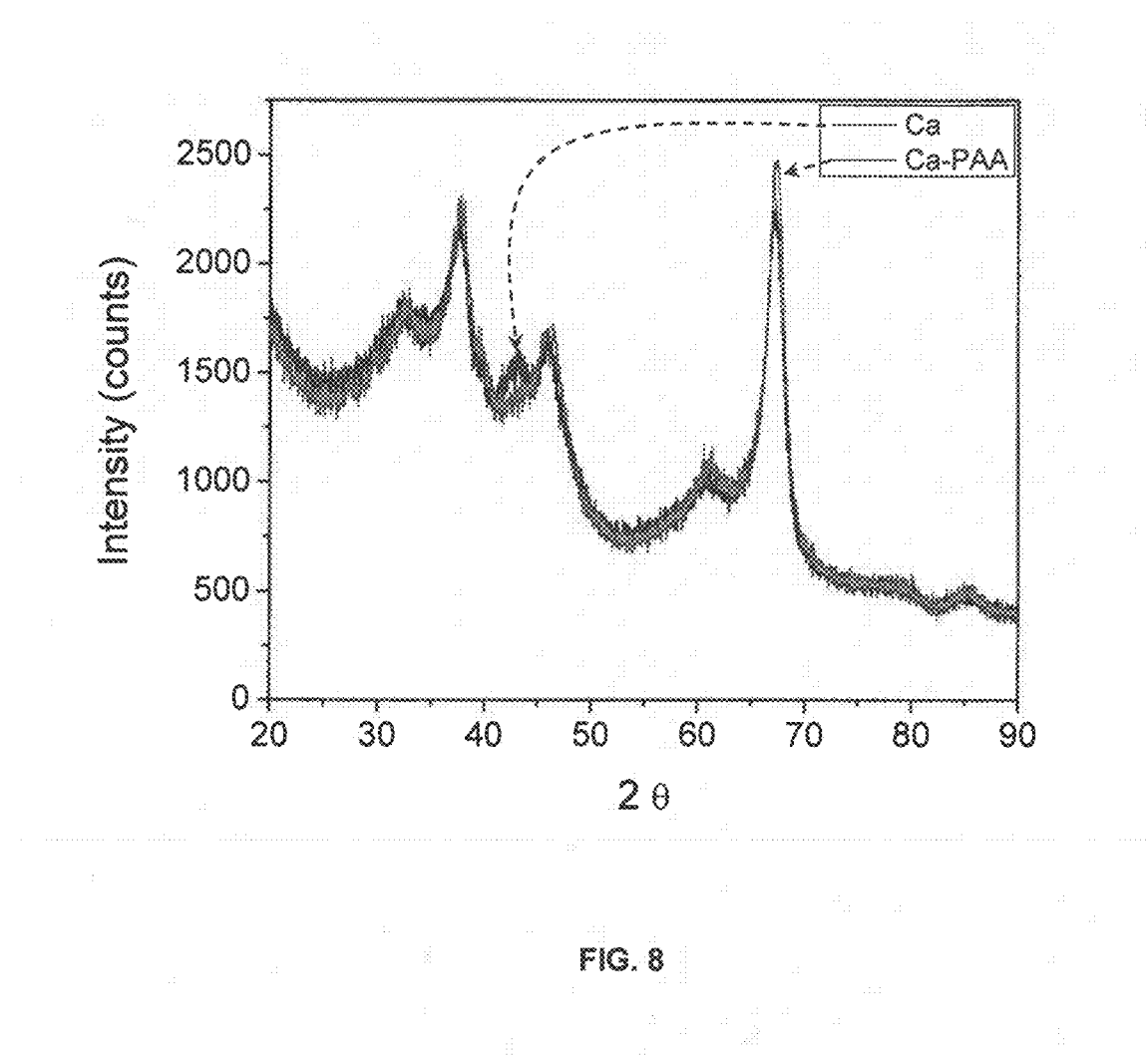
FIG. 8 illustrates X-ray diffraction data for $CaAl_2O_4$ synthesized without PAA (Ca) and with PAA (Ca-PAA), in accordance with various aspects of the present disclosure.
Figure 9:
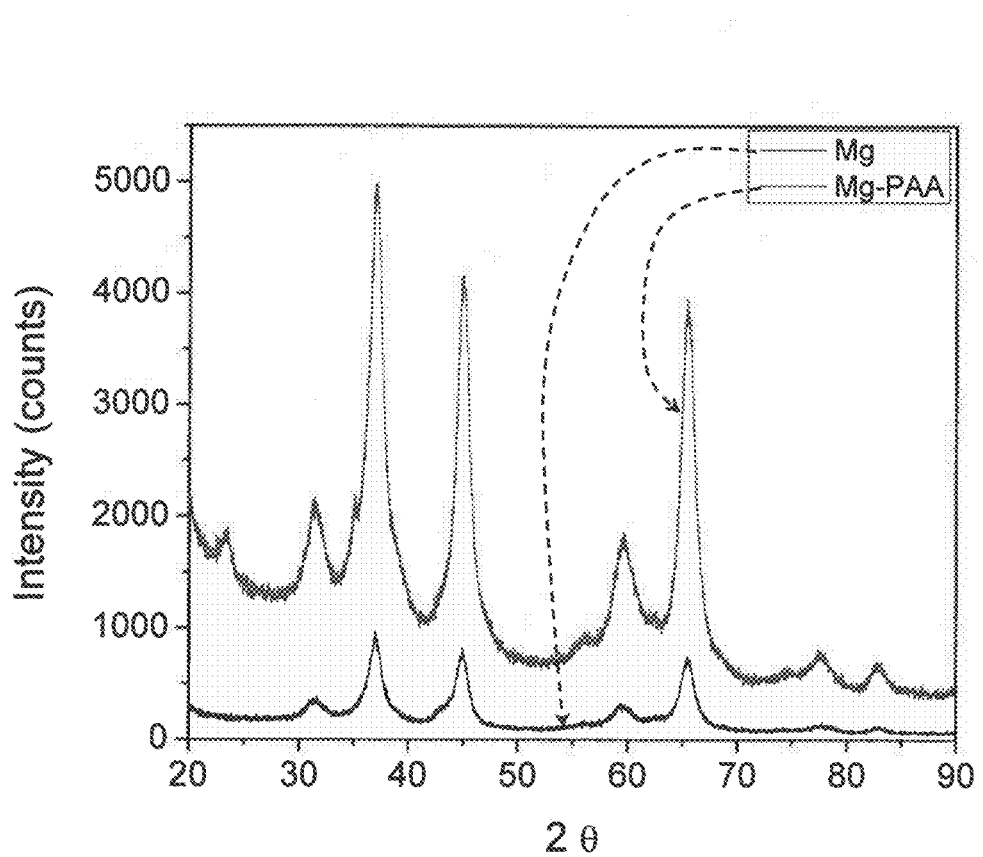
FIG. 9 illustrates X-ray diffraction data for $MgAl_2O_4$ synthesized without PAA (Mg) and with PAA (Mg-PAA), in accordance with various aspects of the present disclosure.
Figure 10:
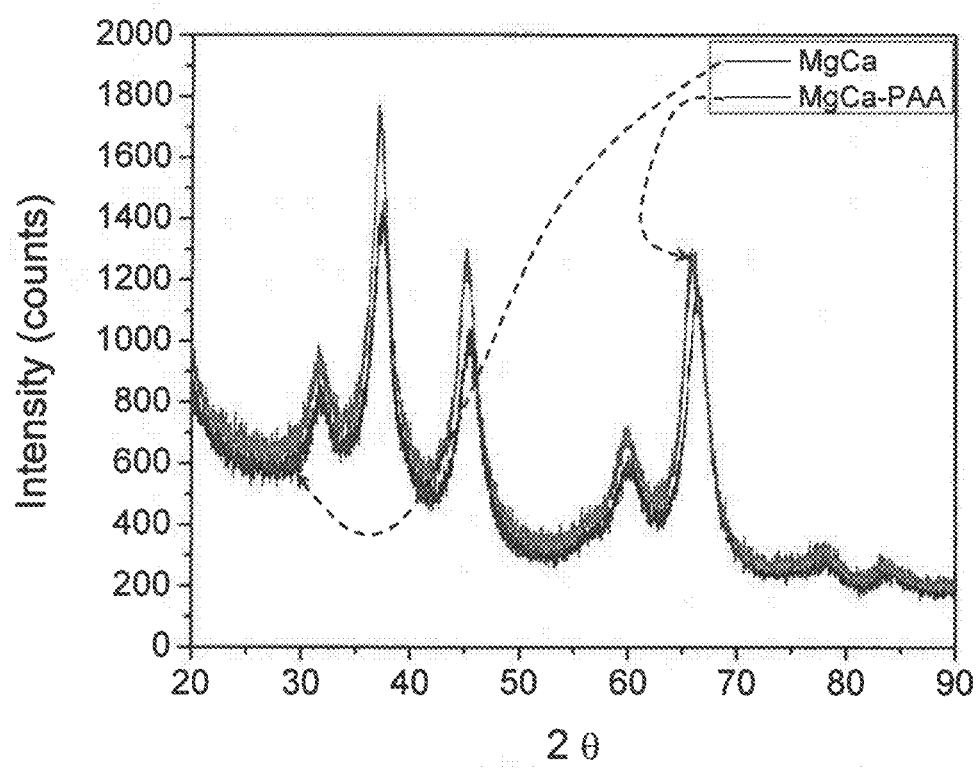
FIG. 10 illustrates X-ray diffraction data for $MgCaAl_2O_4$ synthesized without PAA (MgCa) and with PAA (MgCa-PAA), in accordance with various aspects of the present disclosure.
Figure 11:
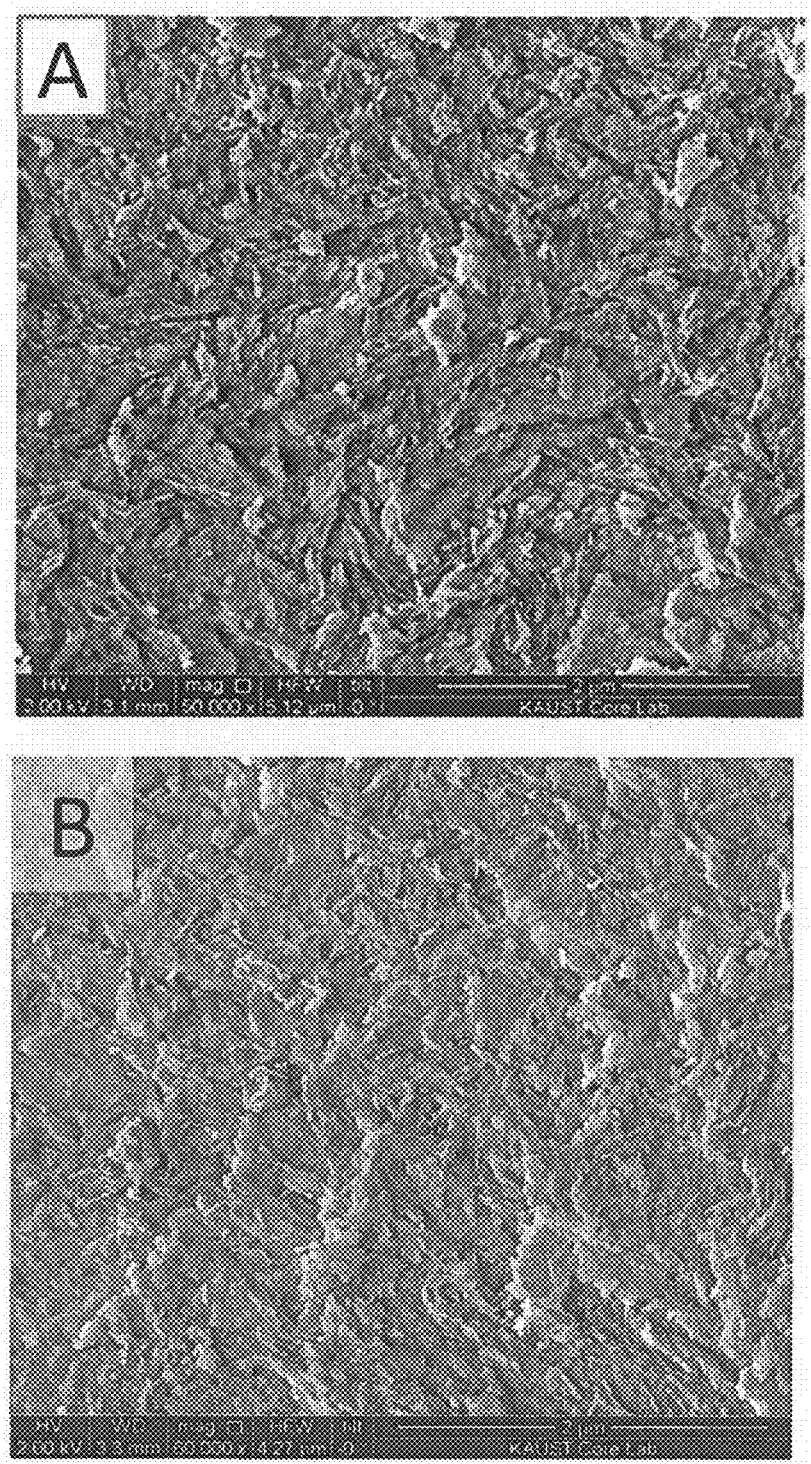
FIG. 11 illustrates scanning electron micrographs of $CaAl_2O_4$ synthesized without PAA (A) and with PAA (B), in accordance with various aspects of the present disclosure.
Figure 12:
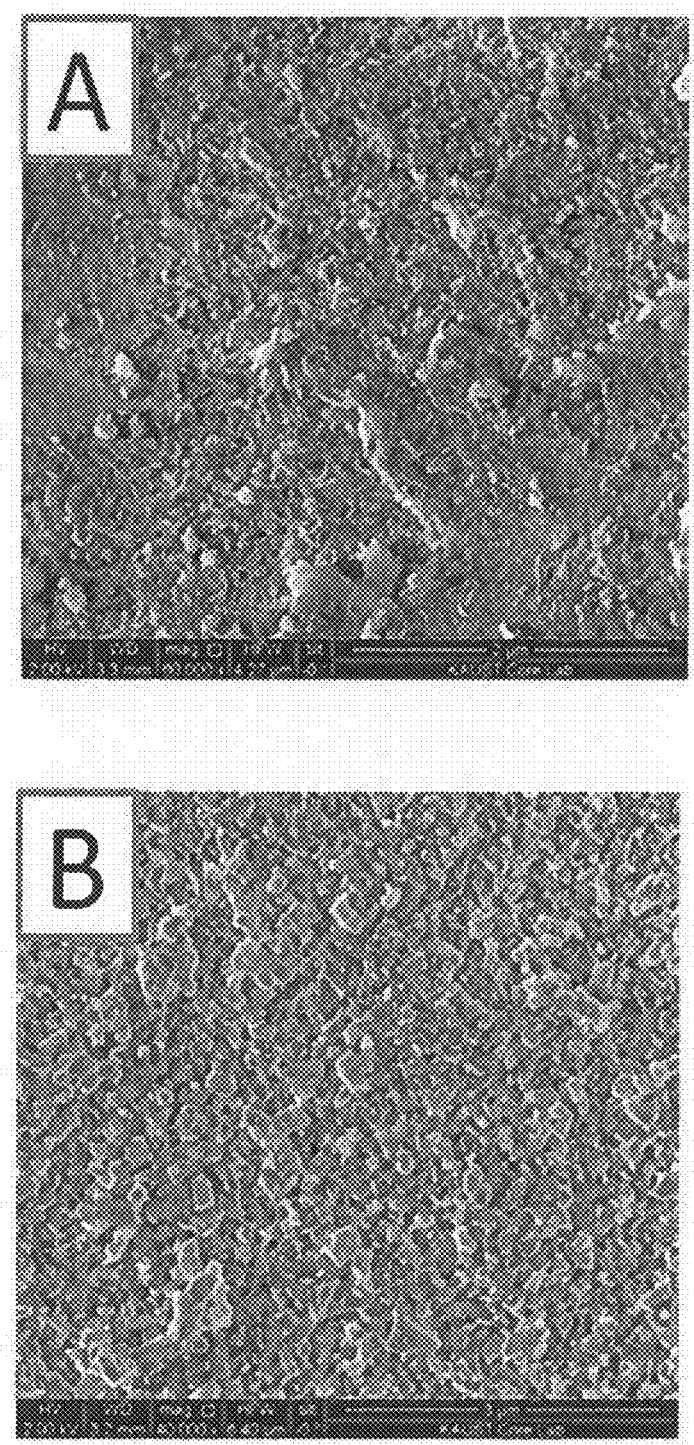
FIG. 12 illustrates scanning electron micrographs of $MgAl_2O_4$ synthesized without PAA (A) and with PAA (B), in accordance with various aspects of the present disclosure.

In a third example, X-ray Diffractograms and scanning electron micrographs were taken of samples made without and with the use of PAA with the alkaline earth and aluminum salts prior to precipitation (see FIGS. 8-12). FIGS. 8-10 shows X-ray diffractograms of different spinels synthesized with and without PAA. The diffractograms shows that all oxides possess spinels crystallographic structure. Moreover the usage of polymer during synthesis stage has not altered or changed the spinel phase.

FIGS. 11A and 12A show $CaAl_2O_4$ and $MgAl_2O_4$ synthesized without polymer and FIGS. 11B and 12B show $CaAl_2O_4$ and $MgAl_2O_4$ synthesized in the presence of PAA. The spinels synthesized using PAA show different morphology, structure is more compact and has less intra-particles distance. These properties are key in lessening the sintering on long term usage which results in enhanced life span of the catalyst.

Example 4

Thermogravimetric Results of Sample Made with PAA

In a fourth example, prior to TGA analysis, all samples were dried at 120° C. for 10 hours. Then TGA was performed in air atmosphere from ambient temperature to 900° C. at a ramp rate of 5° C./min.

The results indicate that all samples decompose in three steps between ambient to 600° C. The first decomposition step involves evaporation of loosely adhered water. The second and third step involves decomposition and polymerization of hydroxyl groups and as well as decomposition of PAA. The weight loss in first, second, and third steps are approximately 10%, 22%, and 18%, respectively.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

Example 5

Calcination Temperature and Surface Area

In a fifth example, spinels were calcined at various temperatures and then BET surface area measurements were obtained on the calcined materials. Table 3, below, details the surface area values for the spinels evaluated in this example.

TABLE 3

BET surface area for different spinel systems obtained after different calcination temperature.

| Spinel samples | BET surface area, $m^2/g$ at different temperature. | | |
|---|---|---|---|
|  | 400° C. | 550° C. | 800° C. |
| MgAl | 103 | 121 | 104 |
| MgAl/PAA | 81 | 132 | 120 |
| CaAl | 106 | 110 | 133 |
| CaAl/PAA | 129 | 126 | 146 |
| MgCaAl | 114 | 122 | 150 |
| MgCaAl/PAA | 105 | 132 | 157 |

From the surface area data detailed in Table 3, above, surface areas were lower for spinels calcined at 400° C., as compare to those calcined at 550° C. and 800° C. For MgAl and MgAl/PAA spinels, the surface area decreased as the calcination temperature was changed from 550° C. to 800° C., whereas, for CaAl, CaAl/PAA, MgCaAl, and MgCaAl/PAA, the surface area increased upon calcining at 800° C.

Example 6

Polymer Concentration and Surface Area

In a fifth example, the effect of polymer concentration was studied by varying the amount of polymer in the metal precursor solution prior to precipitation. Table 4 details the amount of polymer used and the weight ratio of metal precursors to polymer, together with the resulting BET surface area obtained after calcination at 800° C. for 8 hours.

TABLE 4

BET surface area of different samples synthesized by treating different amount of polymer.

| ID | Sample | Amount of polymer used in g | Wt. of metal precursors/wt. of polymer | BET surface area ($m^2/g$) |
|---|---|---|---|---|
| 1 | $MgAl_2O_4$ + polymer | 0.075 | 336 | 105 |
| 2 | $MgAl_2O_4$ + polymer | 0.15 | 168 | 110 |
| 3 | $MgAl_2O_4$ + polymer | 0.3 | 84 | 121 |
| 4 | $MgAl_2O_4$ + polymer | 0.5 | 50.4 | 154 |
| 5 | $MgAl_2O_4$ + polymer | 0.7 | 36 | 123 |

According to the data in Table 4, the highest surface area for ($MgAl_2O_4$+polymer) was obtained with a weight ratio of metal precursors to polymer of 50.4, although this sample exhibited high viscosity. Samples prepared with weight ratios of 36 and 84 provided surface areas of 123 and 121 $m^2/g$, respectively.

The invention claimed is:

1. A method for the preparation of an alkaline earth aluminate spinel, the method comprising:
   a. contacting an alkaline earth metal salt or a solution thereof, aluminum nitrate or a solution thereof, and polyacrylamide or a solution thereof to form a first solution;
   b. adjusting the pH of the first solution to a value from about 9.5 to about 10.5 to form a precipitate;
   c. digesting the precipitate; and
   d. calcining the digested precipitate to obtain the alkaline earth aluminate spinel.

2. The method of claim 1, wherein step a) comprises:
   a. forming a combined solution of the alkaline earth metal salt and the aluminum nitrate, and
   b. mixing with an aqueous solution of polyacrylamide.

3. The method of claim 1, wherein the alkaline earth metal salt and the aluminum nitrate are equimolar.

4. The method of claim 1, wherein the alkaline earth metal salt comprises at least two different alkaline earth salts selected from the group consisting of: a magnesium salt, a calcium salt, and a barium salt.

5. The method of claim 1, wherein the alkaline earth metal salt is selected from the group consisting of: a magnesium salt, a calcium salt, a barium salt, a combination of a magnesium salt and a calcium salt, a combination of a magnesium salt and a barium salt, and a combination of a barium salt and a calcium salt.

6. The method of claim 5, wherein the alkaline earth salt has a total alkaline earth metal concentration of about 1 M.

7. The method of claim 1, wherein the step of adjusting the pH is accomplished by adjusting the pH to a value from about 9.8 to about 10.0.

8. The method of claim 1, wherein the step of adjusting the pH comprises adding ammonium hydroxide.

9. The method of claim 1, wherein prior to the step of digesting, the precipitate is agitated for at least about one hour.

10. The method of claim 1, wherein the step of digesting comprises heating in a water bath at a temperature of about 80° C. for at least about 12 hours.

11. The method of claim 1, wherein after the step of digesting, the precipitate is separated, washed, and dried prior to the step of calcining.

12. The method of claim 1, wherein the precipitate is separated from a supernatant liquid using a centrifuge.

13. The method of claim 1, wherein the step of adjusting the pH comprises adding a pH adjuster, the pH adjuster being selected from the group consisting of: urea, a solution of urea, ammonia, ammonium hydroxide, and combinations thereof.

14. The method of claim 13, wherein the step of adjusting the pH comprises adding urea and heating to a temperature of from about 125° C. to about 175° C. under about equilibrium vapor pressure conditions.

15. The method of claim 1, wherein the alkaline earth metal salt is contacted with the polyacrylamide prior to formation of the precipitate.

16. A nanocrystalline alkaline earth metal aluminate spinel prepared according to the method of claim 1.

17. The nanocrystalline alkaline earth metal aluminate spinel of claim 16, having a surface area of at least about 120 m$^2$/g after calcination at a temperature of 800° C.

18. The nanocrystalline alkaline earth metal aluminate spinel of claim 16, having a surface area from about 120 m$^2$/g to about 160 m$^2$/g after calcination at a temperature of 800° C.

19. The nanocrystalline alkaline earth metal aluminate spinel of claim 16, having a surface area of from about 120 m$^2$/g to about 145 m$^2$/g after calcination at a temperature of 800° C.

20. The nanocrystalline alkaline earth metal aluminate spinel of claim 16, having a pore diameter after calcining of from about 100 nm to about 110 nm.

\* \* \* \* \*